United States Patent [19]

Brennan et al.

[11] 4,415,672

[45] Nov. 15, 1983

[54] GLASS-CERAMIC COMPOSITIONS OF HIGH REFRACTORINESS

[75] Inventors: John J. Brennan, Portland, Conn.; Kenneth Chyung; Mark P. Taylor, both of Painted Post, N.Y.

[73] Assignee: Corning Glass Works, Corning, N.Y.

[21] Appl. No.: 380,464

[22] Filed: May 20, 1982

[51] Int. Cl.³ .............................................. C03C 3/22
[52] U.S. Cl. .......................................... 501/4; 501/5; 501/7
[58] Field of Search .................................. 501/4, 5, 7

[56] References Cited

U.S. PATENT DOCUMENTS

| | | | |
|---|---|---|---|
| 3,161,473 | 12/1964 | Pultz | 501/95 |
| 3,238,085 | 3/1966 | Hayami et al. | 501/7 |
| 3,371,995 | 3/1968 | Pultz | 501/95 |
| 3,537,868 | 11/1970 | Kosake et al. | 501/7 |
| 3,573,939 | 4/1971 | Beall | 501/7 |
| 3,607,608 | 9/1971 | Siefort | 501/35 |
| 3,681,187 | 8/1972 | Bowen et al. | 501/38 |
| 3,732,116 | 5/1973 | Reede | 501/7 |
| 3,843,551 | 10/1974 | Muller et al. | 501/4 |
| 3,940,277 | 2/1976 | Pierson et al. | 501/4 |
| 3,948,669 | 4/1976 | Brydges et al. | 501/10 |
| 3,977,886 | 8/1976 | Muller | 501/4 |
| 4,256,378 | 3/1981 | Prewo et al. | 501/95 |
| 4,263,367 | 4/1981 | Prewo et al. | 428/408 |
| 4,265,968 | 5/1981 | Prewo | 428/426 |
| 4,314,852 | 2/1982 | Brennan et al. | 501/95 |
| 4,324,843 | 4/1982 | Brennan et al. | 428/367 |

*Primary Examiner*—Mark Bell
*Attorney, Agent, or Firm*—C. S. Janes, Jr.

[57] ABSTRACT

The instant invention is directed to the preparation of glass-ceramic bodies exhibiting high strengths and use temperatures up to 1200° C. The bodies consist essentially, expressed in terms of weight percent on the oxide basis, of

| | |
|---|---|
| $Li_2O$ | 1.5–5 |
| $Al_2O_3$ | 15–25 |
| $SiO_2$ | 60–75 |
| $ZrO_2$ | 1–5 |
| $Nb_2O_5$ | 0–10 |
| $Ta_2O_5$ | 0–10 |
| $Nb_2O_5 + Ta_2O_5$ | 1–10 |
| $MgO$ | 0–10 | where excellent resistance to oxidation up to temperatures of 1200° C. is desired, 0.5–3% $As_2O_3$ will be included in the composition.

4 Claims, No Drawings

GLASS-CERAMIC COMPOSITIONS OF HIGH REFRACTORINESS

BACKGROUND OF THE INVENTION

The production of glass-ceramic articles originated in U.S. Pat. No. 2,920,971. As is explained therein, glass-ceramic articles are derived through the controlled heat treatment of precursor glass bodies. Hence, the preparation of glass-ceramic articles commonly contemplates three basic steps: first, a glass forming batch of a desired composition, most frequently containing a nucleating agent, is melted; second, the melt is simultaneously cooled to a glass and an article of a predetermined configuration is shaped therefrom; and, third, the glass article is subjected to a heat treatment whereby nuclei are first generated in situ within the glass and thereafter crystals are grown on those nuclei.

Because the crystals are formed on a myriad of previously-developed nuclei, the microstructure of glass-ceramic articles typically consists of relatively uniformly-sized, fine-grained crystals homogeneously dispersed throughout a residual glassy matrix. Inasmuch as glass-ceramic articles are generally highly crystalline, viz., greater than about 50% by volume, the mechanical strengths thereof will normally be substantially greater than those of the precursor glass bodies. In point of fact, the glass-ceramic product will customarily exhibit physical properties quite different from those of the parent glass and more closely akin to those of the crystal phase. For example, where a refractory crystal phase is developed, the glass-ceramic will typically have a higher use temperature than that of the initial glass. The residual glassy matrix will generally have a composition very different from that of the precursor glass body since the components comprising the crystal phase will have been removed therefrom. Finally, because the crystals are grown in situ and are dispersed within a continuous residual glassy matrix, glass-ceramic articles are free from voids and non-porous.

In the more than two decades that have elapsed since the initial disclosure of glass-ceramic articles, many workers have entered the field and their research has led to the production of glass-ceramic bodies from a broad range of parent glass compositions. This capability of preparing glass-ceramic bodies from vastly different starting materials has resulted in products of widely-varying properties which, in turn, has recommended their utility in a diverse assortment of applications.

As noted above, certain glass-ceramic products demonstrate high temperature capabilities which, when coupled with a relatively low coefficient of thermal expansion to insure good resistance to thermal shock, have suggested their use in such applications as preform cores in the making of hollow metal castings, such as jet engine blades and vanes.

Although glass-ceramic articles are commonly inherently mechanically stronger than glass, for some applications even higher strengths are demanded. That requirement has led to the development of means for enhancing the strength of glass-ceramic bodies through such techniques as thermal tempering, chemical strengthening, and laminating to implant a thin surface layer thereon having a lower coefficient of expansion than the interior portion. Another method for imparting increased strength to a glass-ceramic article, which also appears to improve the toughness thereof, involves the incorporation of inorganic fibers therein.

U.S. Pat. No. 3,607,608 illustrates the inclusion of fibers prepared from stainless steel, boron, SiC, or graphite into glasses, carbides, nitrides, $Al_2O_3$, and devitrified glasses. In the latter case, the fibers are aligned in a molten glass, the mass pressed together into a glass body of a desired geometry, and the glass thereafter devitrified (crystallized) through exposure to a heat treatment. Two base glass compositions were reported in the patent and those are listed below in weight percent:

| | | | |
|---|---|---|---|
| $SiO_2$ | 4 | $SiO_2$ | 28.7 |
| $Al_2O_3$ | 3 | CaO | 9.1 |
| $B_2O_3$ | 10 | $Na_2O$ | 11.77 |
| PbO | 83 | $B_2O_3$ | 26.3 |
| | | ZnO | 5.3 |
| | | BaO | 17.2 |
| | | $F_2$ | 3.1 |

U.S. Pat. No. 3,681,187 describes the incorporation of carbon fibers into a variety of glass and glass-ceramic bodies. The patent cites the use of glass-ceramics having base compositions within the $Li_2O$-$Al_2O_3$-$SiO_2$, $Li_2O$-$ZnO$-$SiO_2$-$P_2O_5$, and $Li_2O$-$MgO$-$SiO_2$-$P_2O_5$ systems. The fibers may be aligned in molten glass or hot pressed together with powdered glass. In the latter practice, the pressing is carried out at a sufficiently high temperature to cause the glass to become plastic and flow around the fibers to form a proper matrix therefor. The resulting glass composite was thereafter heat treated to effect crystallization in situ of the glass.

U.S. Pat. No. 3,940,277 outlines a method for making glass-ceramic articles exhibiting toughness and thermoplastic characteristics composed of silica fibers dispersed within a glassy matrix having a base composition in the $Na_2O$ and/or $K_2O$-$SiO_2$ field.

U.S. Pat. No. 3,948,669 is directed to the production of glass-ceramic articles containing $TiO_2$ fibers which are grown in situ via heat treating glasses having base compositions within the alkaline earth metal oxide-$Al_2O_3$-$B_2O_3$-$TiO_2$ system.

The high temperature capability of SiC has recommended the use of fibers of that composition as reinforcing agents in applications wherein the articles will be exposed to very elevated temperatures. U.S. Pat. Nos. 3,161,473 and 3,371,995, for example, specifically refer to the use of such fibers in glasses and ceramics.

Other patents of interest include U.S. Pat. Nos. 4,256,378, 4,263,367, and 4,265,968 which are directed to the use of graphite fibers as reinforcing elements in glass composite materials; U.S. Pat. No. 4,314,852 which discloses the utility of SiC fibers as reinforcing agents in glass composite materials; and U.S. Pat. No. 4,324,843 which describes the applicability of SiC fibers for reinforcing ceramic composite materials.

One problem that has been experienced in the use of SiC fibers as reinforcing agents in matrices which will be exposed to very high temperature environments (~1000° C. and higher) has been the propensity of the fibers to be oxidized and, therefore, subject to disintegration with consequent loss of mechanical strength in the composite article.

Accordingly, the primary objective of the instant invention is to provide a glass-ceramic body of high strength and capable of high temperature use, that is, capable of use in applications involving exposure to temperatures in excess of 1000° C. and up to 1200° C.

A more narrowly-defined objective is to provide a glass-ceramic material capable of high temperature use and which demonstrates excellent resistance to oxidation at temperatures up to 1200° C. This latter feature permits the material to be utilized as a matrix to be reinforced through the incorporation of SiC fibers therewithin, since it will protect the fibers from disintegration through oxidation thereof.

SUMMARY OF THE INVENTION

We have found that the primary objective can be achieved in glass-ceramic bodies having base compositions which are essentially $TiO_2$-free and which are selected from the $Li_2O$-$Al_2O_3$-$SiO_2$-$ZrO_2$-$Nb_2O_5$ and/or $Ta_2O_5$ system. Beta-spodumene and/or beta-quartz solid solutions constitute the predominant crystal phase. More specifically, the operable compositions consist essentially, expressed in terms of weight percent on the oxide basis, of:

|  |  |
|---|---|
| $Li_2O$ | 1.5–5 |
| $Al_2O_3$ | 15–25 |
| $SiO_2$ | 60–75 |
| $Ta_2O_5$ | 0–10 |
| $Nb_2O_5$ | 0–10 |
| $Ta_2O_5 + Nb_2O_5$ | 1–10 |
| $ZrO_2$ | 1–5 |
| MgO | 0–10 |

We have found that the second objective can be accomplished in glass-ceramic bodies having base compositions which are essentially $TiO_2$-free and are selected from the $Li_2O$-$Al_2O_3$-$As_2O_3$-$SiO_2$-$ZrO_2$-$Nb_2O_5$ and/or $Ta_2O_5$ system. Again, beta-spodumene and/or beta quartz solid solutions constitute the predominant crystal phase. More specifically, the inventive compositions consist essentially, expressed in terms of weight percent on the oxide basis of:

|  |  |
|---|---|
| $Li_2O$ | 1.5–5 |
| $Al_2O_3$ | 15–25 |
| $As_2O_3$ | 0.5–3 |
| $SiO_2$ | 60–75 |
| $ZrO_2$ | 1–5 |
| $Nb_2O_5$ | 0–10 |
| $Ta_2O_5$ | 0–10 |
| $Nb_2O_5 + Ta_2O_5$ | 1–10 |
| MgO | 0–10 |

Although $TiO_2$ has performed the function of a nucleating agent in virtually all of the commercially marketed glass-ceramic products, it does exert an effect as a flux and, hence, ought not to be employed as a primary nucleating agent in the subject compositions which are particularly designed for high temperature applications. Therefore, although a minor amount thereof can be tolerated, the virtual absence of $TiO_2$ is much preferred.

Moreover, where a composite body consisting of SiC fibers implanted within a glass-ceramic matrix is to be fabricated, the virtual absence of $TiO_2$ is essentially mandatory. Thus, $TiO_2$ appears to form titanium silicide intermetallic compounds at the interface of the SiC fiber-matrix interface during formation of the composite body, thereby resulting in low fracture toughness.

$ZrO_2$ does not act as a flux nor does it cause embrittlement of the fibers and, accordingly, can be utilized as a nucleating agent for the inventive compositions. Excessive amounts of $ZrO_2$, however, can lead to problems in melting the glass batch and to undesirable devitrification of the parent glass during formation of the composite body prior to the heat treatment designed to controllably crystallize the glass of the composite in situ. Accordingly, a maximum $ZrO_2$ content of 3% is preferred.

$Li^+$ ions, being very mobile, seem to cause an as yet undefined interfacial reaction with SiC fibers which deleteriously affects the overall properties of the composite. Hence, where a composite body containing SiC fibers is to be fabricated, the maximum $Li_2O$ content will most preferably be limited to about 3.5%.

In the compositions which are more desirable both from the standpoint of fabrication into fine-grained, highly crystalline bodies and for highest temperature utility, MgO will be substituted in part for $Li_2O$ up to about 60 mole percent of the $Li_2O$ content. Such substitution yields a Mg-stuffed beta-quartz and/or beta-spodumene solid solution as a primary crystal phase. To insure highly crystalline glass-ceramics wherein the crystals are uniformly fine grained, at least about 2% by weight of $Li_2O$ and 1.5% by weight of MgO will most preferably be included in the base composition. Most desirably, the maximum MgO content will be held at 6% by weight.

Arsenic, customarily added as $As_2O_5$ to the original glass batch, significantly enhances the resistance of the inventive glass-ceramics to oxidation. It is postulated that arsenic, because it can exist in two oxidation states, viz., $As^{+3}$ and $As^{+5}$, acts as an oxygen buffer which traps oxygen as it migrates inwardly from the surface of the composite. Self-evidently, the buffer can become saturated and, when that occurs, oxidation will proceed normally. Amounts of arsenic in excess of 3%, expressed in terms of $As_2O_3$, do not appear to impart any substantive advantage and may adversely affect the physical properties of the inventive products.

$Nb_2O_5$ and $Ta_2O_5$ improve the refractory character of the inventive glass-ceramics and may act as secondary nucleants. However, they serve a most important function when SiC fiber-containing composite articles are fabricated. Thus, the inclusion of $Nb_2O_5$ and/or $Ta_2O_5$ has been found to provide in situ protection from SiC-glass interaction via the formation of NbC and/or TaC at the SiC-glass interface and/or the development of a very thin protective layer around the SiC fiber. Whatever the mechanism involved, the NbC or TaC reaction product functions to limit active oxidation of the SiC fibers at elevated temperatures and to inhibit SiC-glass interfacial reactivity. Because of the development of this carbide layer, it will be appreciated that the niobium and/or tantalum content in the glass-ceramic matrix will be reduced to the extent of the carbide layer.

Up to about 10% by weight total of such extraneous metal oxides as ZnO, BaO, $Fe_2O_3$, $Nd_2O_3$, $Na_2O$, $K_2O$, CaO, and SrO may be incorporated into the base composition to modify the melting and forming capabilities and/or the physical properties of the inventive products, the amount of each individual oxide being so limited as to avoid any substantial adverse effect upon the properties desired. Most particularly, the level of extraneous oxides must be kept sufficiently low that the refractoriness of the material will not be impaired, excess glassy phase will not be generated, and/or low melting crystal phases are not developed. In general, then, values of the individual oxides will be held below 5% and, most preferably, below 3%. Transition metal and rare earth metal colorants may be included in conventional amounts.

The method for preparing the inventive articles contemplates three fundamental steps: first, a glass-forming batch of a desired composition is melted; second, the melt is simultaneously cooled to at least below the transformation range thereof and a glass article of a predetermined geometry shaped therefrom; and, third, the glass article is exposed to a temperature between about 750°–1200° C. for a period of time sufficient to obtain a highly crystalline body.

The transformation range has been defined as the temperature at which a liquid melt is considered to have been transformed into an amorphous solid; that temperature customarily being deemed to lie in the vicinity of the annealing point of a glass. Because the crystallization process is a function of time and temperature, the process proceeding more rapidly at higher temperatures, relatively brief dwell periods will be required at the hotter extreme of the range, e.g., perhaps 0.25 hour or even less, whereas much longer exposures, 24 hours or longer, may be necessary at the cooler end of the heat treating range to secure high crystallinity.

The heat treatment is designed to perform two principal functions: (1) to provide good nucleation such that (2) a highly crystalline, fine-grained glass-ceramic article will be produced upon further heating. Nucleation occurs at temperatures somewhat above the transformation range with the final crystallization being accomplished at temperatures between about 875°–1200° C. Accordingly, a nucleation time of about 1–6 hours will frequently be utilized at temperatures between about 750°–850° C., followed by a crystallization growth period of about 1–8 hours.

PRIOR ART

U.S. Pat. No. 3,238,085 discloses the preparation of glass-ceramic articles having base compositions within the $Li_2O$-$SiO_2$ system and which utilize 2–8% by weight $As_2O_3$ as a required nucleating agent. The compositions may optionally also contain at least one member of the group CaO, ZnO, CdO, $CeO_2$, $Sb_2O_3$, $Al_2O_3$, and $B_2O_3$, each in an amount less than 50% by weight. About 2–8% by weight of $MoO_3$ and/or $WO_3$ may also be included as a supplementary nucleating agent. No reference is made to $Ta_2O_5$ or $Nb_2O_5$.

U.S. Pat. No. 3,537,868 is concerned with the preparation of glass-ceramic articles having base compositions within the $Li_2O$-$Al_2O_3$-$SiO_2$ field which are nucleated with two kinds of agents: (1) with $Ta_2O_5$ and/or $Nb_2O_5$; and (2) with $TiO_2$ and/or $ZrO_2$. The statedly operable glasses consist essentially, in weight percent, of:

| | |
|---|---|
| $SiO_2$ | 50.0–80.0 |
| $Al_2O_3$ | 10.0–35.0 |
| $Li_2O$ | 1.5–10.0 |
| $Nb_2O_5$ | 0–7.0 |
| $Ta_2O_5$ | 0–7.0 |
| $Nb_2O_5 + Ta_2O_5$ | 0.1–7.0 |
| $TiO_2$ | 0–10 |
| $ZrO_2$ | 0–5 |
| $TiO_2 + ZrO_2$ | 0.1–7.0 |
| $Nb_2O_5 + Ta_2O_5 + TiO_2 + ZrO_2$ | 1.0–15.0 |
| $Li_2O + SiO_2 + Al_2O_3 + Nb_2O_5 + Ta_2O_5 + TiO_2 + ZrO_2$ | >90.0 |

Up to about 4% individually of the following optional ingredients may be included: $Na_2O$, $K_2O$, BeO, CaO, SrO, BaO, ZnO, CdO, PdO, and $Bi_2O_3$. Up to 8% individually of MgO and $B_2O_3$ may be added.

$As_2O_3$ is an optional ingredient which, if present, performs as a fining agent. In the working examples, $As_2O_3$ was reported as 0.3% or 0.5%.

$TiO_2$ is a useful optional component and there is no teaching of the utility of substantial amounts of $As_2O_3$ to function as an oxygen buffer.

U.S. Pat. No. 3,573,939 discloses the production of glass-ceramic articles consisting essentially, in weight percent, of 2–7% $Li_2O$, 0–25% $Al_2O_3$, 10–60% $SiO_2$, and 20–80% $Ta_2O_5 + Nb_2O_5$, where $Nb_2O_5$ comprises 0–20%. Up to 10% total of such compatible metal oxides as ZnO, MgO, $B_2O_3$, $Na_2O$, $K_2O$, CaO, SrO, PbO, and $P_2O_5$ may optionally be present. Individually, the quantities of $B_2O_3$, $Na_2O$, $K_2O$, CaO, SrO, PbO, and $P_2O_5$ ought not to exceed 5%.

The essential absence of $TiO_2$ is not demanded, the total of $Ta_2O_5$ and/or $Nb_2O_5$ is far in excess of that required in the instant inventive products, and $As_2O_5$ is merely noted as being useful as a fining agent, if one is needed.

U.S. Pat. No. 3,732,116 is directed to the formation of glass-ceramic articles consisting essentially, in weight percent, of 3–6% $Li_2O$, 15–20% $Al_2O_3$, 65–70% $SiO_2$, 1–6% total of at least one member of the group 1–4% SrO, 1–4% $Y_2O_3$, 1–5% $La_2O_3$, and 1–5% $Ta_2O_5$, and 2–7% $RO_2$ wherein $RO_2$ consists of 2–6% $TiO_2$ and 0–3% $ZrO_2$. Up to 5% total of optional additions may be present from the following: BaO, CaO, $K_2O$, MgO, $Na_2O$, and ZnO. $As_2O_3$ is noted as being optionally included as a fining agent.

The presence of $TiO_2$ is required and $As_2O_3$ is not a necessary component.

U.S. Pat. No. 3,843,551 describes a laserable glass-ceramic article consisting essentially, in weight percent, of:

| | |
|---|---|
| $SiO_2$ | 45–68 |
| $Al_2O_3$ | 15–30 |
| $P_2O_5$ | 0–10 |
| $Li_2O$ | 2–6 |
| MgO | 0–3 |
| ZnO | 0–8 |
| $ZrO_2$ | 2–7 |
| $Ta_2O_5$ | 1–7 |
| $La_2O_3$ | 3–12 |
| Activating Agent | 0.1–5 |

$La_2O_3$ is observed as having a favorable effect upon crystallization. $As_2O_3$ is noted as being a customary fining agent which may optionally be present.

There is no reference to the necessity for having $As_2O_3$ in the composition to perform as an oxygen buffer.

U.S. Pat. No. 3,977,886 is concerned with the production of transparent glass-ceramic articles consisting essentially, in weight percent of:

| | |
|---|---|
| $SiO_2$ | 45–68 |
| $Al_2O_3$ | 15–30 |
| $P_2O_5$ | 0–10 |
| $Li_2O$ | 2–6 |
| MgO | 0–3 |
| ZnO | 0–8 |
| $ZrO_2$ | 2–7 |
| $Ta_2O_5$ | 1–7 |

Up to 15% by weight total of the following components may be included in the indicated proportions of: 0-2% BaO and/or CaO, 0-12% rare earth oxides, 0-1% $Na_2O$ and/or $K_2O$, and 0-1% $As_2O_3$ and/or $Sb_2O_3$, the latter two ranges of constituents function in combination to fine the glass.

There is no reference to the necessity for having $As_2O_3$ in the composition to perform as an oxygen buffer.

DESCRIPTION OF PREFERRED EMBODIMENTS

Table I reports compositions, expressed in terms of parts by weight on the oxide basis, of thermally crystallizable glasses within the $Li_2O$-$Al_2O_3$-$SiO_2$-$ZrO_2$-$Ta_2O_5$ and/or $Nb_2O_5$-$As_2O_3$ system which, when subjected to the heat treatment practice of the instant invention, crystallized in situ to relatively uniformly fine-grained glass-ceramic articles wherein β-spodumene and/or stuffed β-quartz solid solution constituted the primary crystal phase. Inasmuch as the sum of the tabulated components totals or approximately totals 100, for all practical purposes the values recorded for the individual ingredients may be deemed to reflect weight percent. The actual batch components may comprise any materials, either the oxides or other compounds, which, when melted together, are converted to the desired oxide compositions in the proper proportions.

The batch ingredients were compounded, ballmilled together to assist in securing a homogeneous melt, and deposited into platinum crucibles. The crucibles were introduced into a furnace, heated to about 1650° C., and the batches melted for about 16 hours. Glass bodies were prepared from the melts in two ways. Thus, in the first the melts were poured into steel molds to produce glass slabs having the dimensions of about 6"×6"×½" and the slabs were transferred immediately to an annealer operating at about 650° C. After annealing, specimens of the proper geometry for use in physical property determinations were cut from the slabs. In the second method the melts were poured as a relatively fine stream into a container of water which produced finely-divided particles of glass, this processing being termed "drigaging" in the glass art. Thereafter, the particles were comminuted to form a frit passing a No. 325 United States Standard Sieve (44 microns). This frit can be useful in preparing composite bodies containing fibers.

TABLE I

|  | 1 | 2 | 3 | 4 | 5 | 6 | 7 | 8 |
|---|---|---|---|---|---|---|---|---|
| $SiO_2$ | 69.2 | 67.2 | 65.9 | 65.6 | 71.2 | 67.5 | 69.0 | 72.9 |
| $Al_2O_3$ | 21.1 | 20.5 | 20.1 | 20.0 | 20.7 | 19.7 | 20.1 | 21.2 |
| $Li_2O$ | 3.1 | 3.0 | 3.0 | 2.9 | 5.1 | 4.8 | 4.9 | 3.1 |
| MgO | 1.9 | 1.8 | 1.8 | 1.8 | — | — | — | — |
| ZnO | 1.1 | 1.1 | 1.0 | 1.0 | — | — | — | — |
| $ZrO_2$ | 1.6 | 1.6 | 1.5 | 1.9 | 2.0 | 2.0 | 2.0 | 2.1 |
| BaO | 0.8 | 0.8 | 0.8 | 0.7 | — | — | — | — |
| $Nd_2O_3$ | 0.2 | 0.2 | 0.2 | 0.2 | — | — | — | — |
| $Na_2O$ | 0.2 | 0.2 | 0.2 | 0.2 | — | — | — | — |
| $K_2O$ | 0.1 | 0.1 | 0.1 | 0.1 | — | — | — | — |
| $As_2O_3$ | 0.7 | 0.6 | 0.6 | 0.7 | 1.0 | 1.0 | 1.0 | 1.0 |
| $Nb_2O_5$ | — | 2.9 | 4.8 | — | — | — | 3.0 | — |
| $Ta_2O_5$ | — | — | — | 5.0 | — | 5.0 | — | — |

|  | 9 | 10 | 11 | 12 | 13 | 14 | 15 |
|---|---|---|---|---|---|---|---|
| $SiO_2$ | 67.0 | 68.5 | 70.4 | 66.8 | 68.2 | 69.5 | 68.0 |
| $Al_2O_3$ | 19.5 | 20.0 | 20.5 | 19.5 | 19.9 | 18.5 | 18.2 |
| $Li_2O$ | 2.9 | 2.9 | 2.0 | 1.9 | 2.0 | 2.0 | 1.9 |
| MgO | 2.6 | 2.6 | 4.0 | 3.8 | 3.9 | 4.0 | 3.9 |
| $ZrO_2$ | 2.0 | 2.0 | 2.0 | 2.0 | 2.0 | 2.0 | 2.0 |
| $As_2O_3$ | 1.0 | 1.0 | 1.0 | 1.0 | 1.0 | 1.0 | 1.0 |
| $Nb_2O_5$ | — | 3.0 | — | — | 3.0 | 3.0 | 5.0 |
| $Ta_2O_5$ | 5.0 | — | — | 5.0 | — | — | — |

The test specimens plus the remainders of the slabs were moved to an electrically-heated furnace and exposed to the treatment schedules recited in Table II. In each schedule the temperature of the article was raised at about 5° C./minute. At the conclusion of the tabulated heat treatment, the electric current to the furnace was cut off and the crystallized articles left inside the furnace and permitted to cool to room temperature therein. This practice has been termed "cooling at furnace rate" and has been estimated to average about 3°-5° C./minute.

Table II further records a visual description of the crystallized bodies, an identification of the crystal phases present in each as determined via X-ray diffraction analyses, and various physical properties where measured.

TABLE II

| Example | Heat Treatment | Visual Description | Crystal Phases | Exp. Coeff. |
|---|---|---|---|---|
| 1 | 780° C. for 2 hours<br>1050° C. for 2 hours | Surface crystallized layer | Not internally crystallized, weak | — |
| 2 | 780° C. for 2 hours<br>1050° C. for 2 hours | White opaque, fine-grained | β-spodumene solid solution | $15 \times 10^{-7}$/°C. |
| 3 | 780° C. for 2 hours<br>1050° C. for 2 hours | White opaque, fine-grained | β-spodumene solid solution | — |
| 4 | 780° C. for 2 hours<br>1050° C. for 2 hours | White opaque, fine-grained | β-spodumene solid solution | — |
| 5 | 780° C. for 2 hours<br>1050° C. for 2 hours | Surface crystallized layer | Not internally crystallized, very weak | — |
| 6 | 780° C. for 2 hours<br>1050° C. for 2 hours | Creamy-white opaque, fine-to-medium-grained | β-spodumene solid solution | — |
| 7 | 780° C. for 2 hours<br>1050° C. for 2 hours | White, opaque, fine-grained | β-spodumene solid solution | $3.6 \times 10^{-7}$/°C. |
| 8 | 780° C. for 2 hours<br>1050° C. for 2 hours | Surface crystallized layer | Not internally crystallized, very weak | — |
| 9 | 780° C. for 2 hours<br>1050° C. for 2 hours | Creamy-white opaque, fine-to-medium-grained | β-spodumene solid solution | $12.2 \times 10^{-7}$/°C. |
| 10 | 780° C. for 2 hours<br>1050° C. for 2 hours | White opaque, medium-grained | β-spodumene solid solution | $12 \times 10^{-7}$/°C. |
| 11 | 780° C. for 2 hours<br>1150° C. for 2 hours | Surface crystallized layer | Not internally crystallized, very weak | — |
| 12 | 780° C. for 2 hours<br>1150° C. for 2 hours | Creamy-white, opaque, medium-grained | β-quartz solid solution | $19.1 \times 10^{-7}$/°C. |
| 13 | 780° C. for 2 hours<br>1150° C. for 2 hours | Light-gray, opaque, fine-grained | β-quartz solid solution | — |
| 14 | 780° C. for 2 hours | Light beige opaque, | β-quartz solid | — |

TABLE II-continued

| Example | Heat Treatment | Visual Description | Crystal Phases | Exp. Coeff. |
| --- | --- | --- | --- | --- |
| | 1150° C. for 2 hours | fine-grained | solution | |
| 15 | 780° C. for 2 hours | Light beige opaque, | β-quartz solid | — |
| | 1150° C. for 2 hours | fine-grained | solution | |

As can be observed from an examination of Tables I and II with respect to Examples 1, 5, 8, and 11, where neither $Nb_2O_5$ nor $Ta_2O_5$ is present in the composition, the precursor glass bodies develop a surface crystallized layer only. If the glass is subjected to a very extended heat treatment, crystallization will proceed inwardly to produce a weak, coarsely-crystalline article. This development of surface crystallization only unequivocally underscores the fact that $Nb_2O_5$ and $Ta_2O_5$ perform as nucleating agents in conjunction with $ZrO_2$.

When the parent glass, absent $Nb_2O_5$ and $Ta_2O_5$, is fritted, however, i.e., comminuted to a fine powder, and this frit then heat treated, the surface area of the particle is so great that, upon sintering, the resultant body will be virtually totally crystalline. This essentially total crystallinity has been especially observed where such frits have been utilized in combination with SiC fibers in accordance with the disclosure of Ser. No. 380,458, filed concurrently herewith by us under the title Reaction Inhibited-Silicon Carbide Fiber Reinforced High Temperature Glass-Ceramic Composites, to form a fiber reinforced, crystalline composite body. The mechanism underlying the effect which the SiC fibers exert upon the development of crystallization has not been fully elucidated. It appears, however, that the fibers in some manner provide nucleation since the generated crystallization is relatively fine grained. Whatever the circumstances, a highly crystalline matrix can be developed for enveloping SiC fibers from precursor glass compositions from which $Nb_2O_5$ and $Ta_2O_5$ are absent. Nevertheless, the inclusion of $Nb_2O_5$ and/or $Ta_2O_5$ insures the formation of fine-grained, internally nucleated articles plus, where SiC fibers are present, provides for the development of oxidation resistant NbC and/or TaC coatings on the fibers.

We claim:

1. An opaque glass-ceramic body exhibiting high strength and use temperature up to 1200° C., wherein beta-spodumene and/or beta-quartz solid solution constitutes the predominant crystal phase, which body is essentially free from $TiO_2$ and consists essentially, expressed in terms of weight percent on the oxide basis, of:

| | |
| --- | --- |
| $Li_2O$ | 1.5–5 |
| $Al_2O_3$ | 15–25 |
| $SiO_2$ | 60–75 |
| $ZrO_2$ | 1–3 |
| $Nb_2O_5$ | 0–10 |
| $Ta_2O_5$ | 0–10 |
| $Nb_2O_5 + Ta_2O_5$ | 1–10 |
| MgO | 0–10 |
| ZnO | 0–3 |
| BaO | 0–3 |
| $Fe_2O_3$ | 0–3 |
| $Nd_2O_3$ | 0–3 |
| $Na_2O$ | 0–3 |
| $K_2O$ | 0–3 |
| CaO | 0–3 |
| SrO | 0–3 |
| $ZnO + BaO + Fe_2O_3 + Nd_2O_3 + Na_2O + K_2O + CaO + SrO$ | 0–10 |

2. A glass-ceramic body according to claim 1 wherein MgO is present in an amount of 1.5–6% and $Li_2O$ is present in an amount of 2–3.5%.

3. An opaque glass-ceramic body exhibiting high strength, a use temperature up to 1200° C., and oxidation resistance up to 1200° C., wherein beta-spodumene and/or beta-quartz solid solution constitutes the predominant crystal phase, which body is essentially free from $TiO_2$ and consists essentially, expressed in terms of weight percent on the oxide basis, of:

| | |
| --- | --- |
| $Li_2O$ | 1.5–5 |
| $Al_2O_3$ | 15–25 |
| $As_2O_3$ | 0.5–3 |
| $SiO_2$ | 60–75 |
| $ZrO_2$ | 1–3 |
| $Nb_2O_5$ | 0–10 |
| $Ta_2O_5$ | 0–10 |
| $Nb_2O_5 + Ta_2O_5$ | 1–10 |
| MgO | 0–10 |
| ZnO | 0–3 |
| BaO | 0–3 |
| $Fe_2O_3$ | 0–3 |
| $Nd_2O_3$ | 0–3 |
| $Na_2O$ | 0–3 |
| $K_2O$ | 0–3 |
| CaO | 0–3 |
| SrO | 0–3 |
| $ZnO + BaO + Fe_2O_3 + Nd_2O_3 + Na_2O + K_2O + CaO + SrO$ | 0–10 |

4. A glass-ceramic body according to claim 3 wherein MgO is present in an amount of 1.5–6% and $Li_2O$ is present in an amount of 2–3.5%.

* * * * *